United States Patent
Wong et al.

(10) Patent No.: US 8,970,191 B1
(45) Date of Patent: Mar. 3, 2015

(54) ON/OFF TIME MODULATION FOR CONSTANT ON-TIME AND CONSTANT OFF-TIME SWITCHING REGULATORS

(75) Inventors: Lik-Kin Wong, Tai Po (HK); Issac Kuan-Chun Hsu, North Point (HK); Tze-Kau Man, Yuen Long (HK)

(73) Assignee: National Semiconductor Corporation, Santa Clara, CA (US)

( * ) Notice: Subject to any disclaimer, the term of this patent is extended or adjusted under 35 U.S.C. 154(b) by 687 days.

(21) Appl. No.: 12/658,021

(22) Filed: Feb. 1, 2010

(51) Int. Cl.
*G05F 1/00* (2006.01)

(52) U.S. Cl.
USPC .......................................... 323/282; 323/271

(58) Field of Classification Search
USPC .......................................... 323/282–285, 271
See application file for complete search history.

(56) References Cited

U.S. PATENT DOCUMENTS

| | | | |
|---|---|---|---|
| 7,019,504 B2 * | 3/2006 | Pullen et al. | 323/283 |
| 7,330,019 B1 * | 2/2008 | Bennett | 323/282 |
| 7,443,148 B2 * | 10/2008 | Weng | 323/271 |
| 7,482,791 B2 * | 1/2009 | Stoichita et al. | 323/271 |
| 7,782,036 B1 * | 8/2010 | Wong et al. | 323/282 |
| 2005/0007087 A1 * | 1/2005 | Pullen et al. | 323/283 |

* cited by examiner

*Primary Examiner* — Jue Zhang
(74) *Attorney, Agent, or Firm* — Andrew Viger; Frederick J. Telecky, Jr.

(57) ABSTRACT

An apparatus includes a constant on-time or constant off-time (COT) switching regulator configured to generate an output signal. The switching regulator includes a switch that is turned on or off for a specified amount of time during each of multiple switching cycles. The apparatus also includes a modulator configured to modulate the specified amount of time that the switch is turned on or off during at least some of the switching cycles. The specified amount of time that the switch is turned on or off during each of the switching cycles could be equal to $t_{ON/OFF} + \Delta t_{MOD} F(\omega_{MOD})$, where $t_{ON/OFF}$ denotes a constant amount of time, $\Delta t_{MOD}$ denotes an amplitude of the second signal, $\omega_{MOD}$ denotes a frequency of the second signal, and $F( )$ denotes a modulation function. This could help to modulate switching noise over a range of frequencies and spread electro-magnetic interference generated by the switching regulator.

18 Claims, 4 Drawing Sheets

ON/OFF TIME MODULATION FOR CONSTANT ON-TIME AND CONSTANT OFF-TIME SWITCHING REGULATORS

TECHNICAL FIELD

This disclosure is generally directed to switching regulators. More specifically, this disclosure relates to on/off time modulation for constant on-time and constant off-time switching regulators.

BACKGROUND

Many systems use switching regulators to generate regulated voltages for use by other components of the systems. For example, a buck or step-down regulator generates an output voltage $V_{OUT}$ that is lower than its input voltage $V_{IN}$. A boost or step-up regulator generates an output voltage $V_{OUT}$ that is higher than its input voltage $V_{IN}$.

Some switching regulators are controlled using constant on-time or constant off-time (COT) techniques. Using conventional COT techniques, one or more switches are turned on or off for a constant amount of time during each switching period, where the switches are used to generate an output signal. COT control techniques can provide various benefits depending on the implementation, such as a fast response time and a constant switching frequency for a fixed load and a fixed input voltage.

Switching regulators that operate in this manner, however, can generate excessive electro-magnetic interference (EMI), which may interfere with other circuits. The EMI can be caused by noise at the switching frequency and at harmonics of the switching frequency. One approach for reducing EMI is to use external filters with the switching regulators. Unfortunately, these filters require additional circuitry, are bulky and increase the size of the regulators, and cause efficiency losses.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
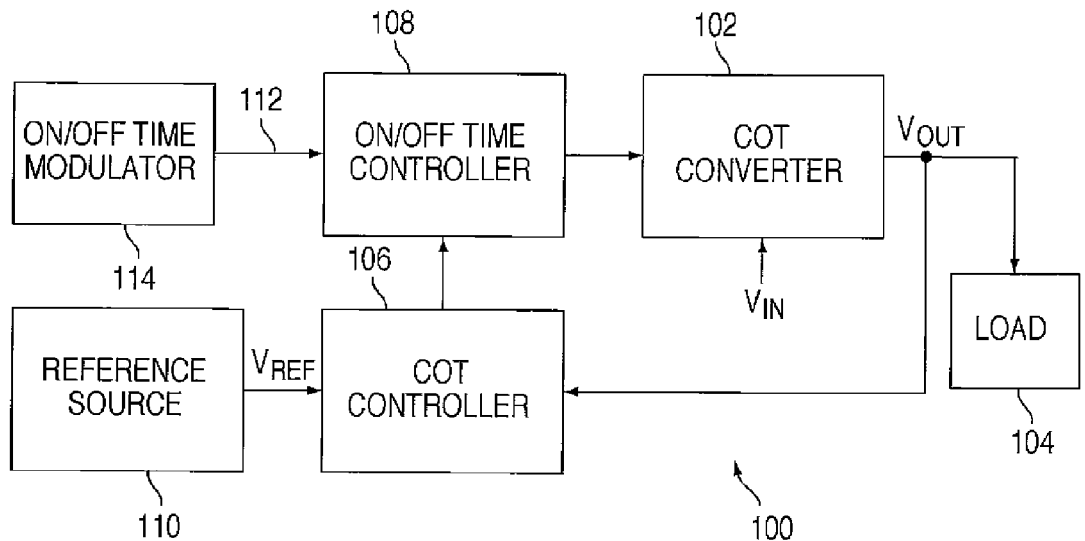
FIG. 1 illustrates an example system for on/off time modulation of a constant on-time or constant off-time (COT) switching regulator according to this disclosure.

FIG. 1 illustrates an example system 100 for on/off time modulation of a constant on-time or constant off-time (COT) switching regulator according to this disclosure. As shown in FIG. 1, the system 100 includes a COT converter 102, which receives an input signal and generates an output signal. In this example, the COT converter 102 receives an input voltage $V_{IN}$ and generates a regulated output voltage $V_{OUT}$ (although the converter 102 could receive an input current and/or generate a regulated output current). Ideally, the COT converter 102 ensures that the output signal remains at a specified value or within a specified range of values. The COT converter 102 represents any suitable switching converter, such as a buck converter, a boost converter, a buck-boost converter, a single ended primary inductor converter (SEPIC), or a flyback converter.

The regulated output signal in this example is provided to a load 104. The load 104 represents any suitable structure that operates using the regulated output signal. The load 104 could, for example, represent one or more light emitting diodes (LEDs) or other illumination devices or any other circuit(s). Note that while a single load 104 is shown here, multiple loads 104 could also be used.

The system 100 also includes a COT controller 106 and an on/off time controller 108. The COT controller 106 compares the output signal to a reference signal (in this case, a reference voltage $V_{REF}$) and generates an output signal based on the comparison. The on/off time controller 108 uses the output signal from the COT controller 106 to control one or more switches in the COT converter 102. For example, the on/off time controller 108 could generate a drive signal that turns one or more switches in the COT converter 102 on or off for a specified amount of time. The COT controller 106 includes any suitable structure for comparing signals, such as a voltage comparator. The on/off time controller 108 includes any suitable structure for controlling one or more switches in a COT converter, such as a one-shot timer. A one-shot timer represents a circuit that, when activated, asserts a signal at a certain level for a specified amount of time.

A reference source 110 generates the reference signal used by the COT controller 106. The reference source 110 represents any suitable reference signal source, such as a bandgap voltage generator. The reference signal (in this case, the reference voltage $V_{REF}$) could represent any suitable reference signal, which typically depends on the specific application.

In a conventional COT regulator, one or more switches are turned on or off for a fixed amount of time. For a given conventional COT regulator and a given load, the switch(es) would be turned on or off for the same amount of time whenever triggered, and the switching frequency is constant for a fixed load and a fixed input voltage (although the switching frequency varies with different loads or input voltages). As described above, conventional COT regulators often suffer from excessive EMI generation.

In accordance with this disclosure, an on/off time modulation signal 112 is used to modulate the on-time or off-time of one or more switches in the COT converter 102. In FIG. 1, the modulation signal 112 varies the behavior of the on/off time controller 108, causing the controller 108 to modify the amount of time that the one or more switches in the COT converter 102 are turned on or off. In particular, the modulation signal 112 causes the on-time or off-time of the switches to vary slightly, such as by oscillating above and below the normal on-time or off-time.

The modulation signal 112 could represent any suitable modulation signal, such as a periodic or random signal. In some embodiments, the normal on-time of the switch(es) in a constant on-time converter may be denoted $t_{ON}$. Also, the modulation signal 112 may represent a periodic modulation signal defined as $\Delta t_{MOD}F(\omega_{MOD})$, where $\Delta t_{MOD}$ denotes the amplitude of the signal 112, $\omega_{MOD}$ denotes the frequency of the signal 112, and F( ) denotes a modulation function. The modulation function F( ) could represent any suitable function, such as a sinusoidal, triangular, or other function(s). The total on-time of the switch(es) in the constant on-time converter could therefore equal $t_{ON}+\Delta t_{MOD}F(\omega_{MOD})$. Note that the amount of modulation provided by the modulation function F( ) could be quite small, such as ±1% to ±3%. A similar modulation could be done to the normal off-time $t_{OFF}$ of the switch(es) in a constant off-time converter.

Figure 2A:
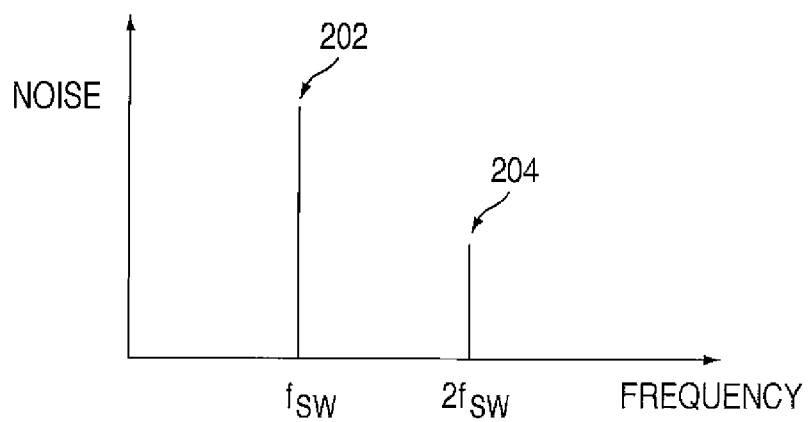
FIGS. 2A and 2B illustrate example waveforms associated with the system of FIG. 1 according to this disclosure.
Figure 2B:
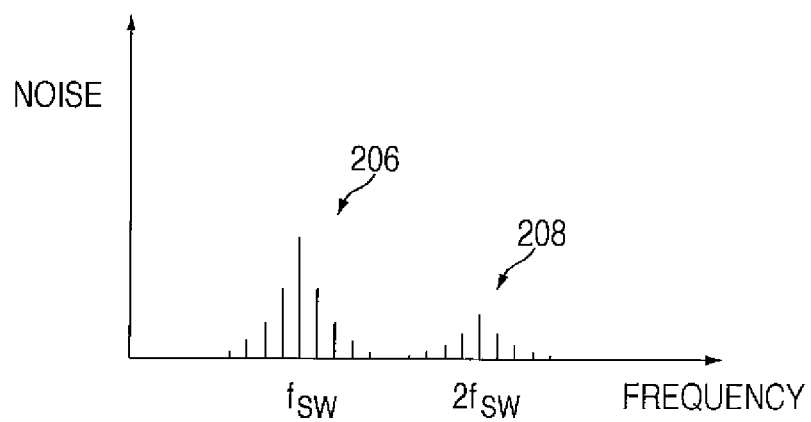

An example result obtained using the on/off time modulation signal 112 is illustrated in FIGS. 2A and 2B, which show example waveforms associated with the system 100 of FIG. 1. In particular, FIG. 2A illustrates simulated operation of the system 100 without the on/off time modulation signal 112. As shown in FIG. 2A, there is noise 202 having large amplitude at the switching frequency $f_{SW}$, along with noise 204 having large amplitude at a harmonic of the switching frequency $2f_{SW}$. The switching frequency $f_{SW}$ denotes the frequency at which one or more switches in the COT converter 102 are turned on or off during operation of the system 100.

FIG. 2B illustrates simulated operation of the system 100 with the on/off time modulation signal 112. As shown in FIG. 2B, the on/off time modulation signal 112 modulates noise 206 over a range of frequencies centered at the switching frequency $f_{SW}$, and the noise 206 is substantially smaller in amplitude compared to the noise 202 in FIG. 2A. Similarly, the on/off time modulation signal 112 modulates noise 208 over a range of frequencies centered at the switching frequency harmonic $2f_{SW}$, and the noise 208 is substantially smaller in amplitude compared to the noise 204 in FIG. 2A.

The use of the on/off time modulation signal 112 effectively modulates the frequency of the noise, lowering the amplitude of the noise at frequencies of interest, such as at the switching frequency $f_{SW}$ and its harmonics. This spreads the power of EMI, making it easier to meet any EMI specifications for a particular application. Moreover, this can be achieved without significantly affecting the fast response time and good regulation properties of the COT converter 102.

In this example, the on/off time modulation signal 112 is generated using an on/off time modulator 114. The on/off time modulator 114 represents any suitable structure that generates a modulation signal having appropriate characteristics for a given application of the system 100. As noted above, the on/off time modulator 114 could represent a signal source that generates a signal equal to $\Delta t_{MOD}F(\omega_{MOD})$.

Although FIG. 1 illustrates one example of a system 100 for on/off time modulation of a COT switching regulator and FIGS. 2A and 2B illustrate example waveforms associated with the system 100 of FIG. 1, various changes may be made to these figures. For example, the functional division shown in FIG. 1 is for illustration only. Various components in FIG. 1 could be combined, further subdivided, or omitted and additional components could be added according to particular needs. As a particular example, an external filter may or may not be used with the system 100 to filter the output signal. Also, the waveforms shown in FIGS. 2A and 2B are for illustration only. The noise in FIG. 2A could exist at any number of harmonics, and the modulated noise in FIG. 2B could have any suitable shape depending on the modulation function.

Figure 3:
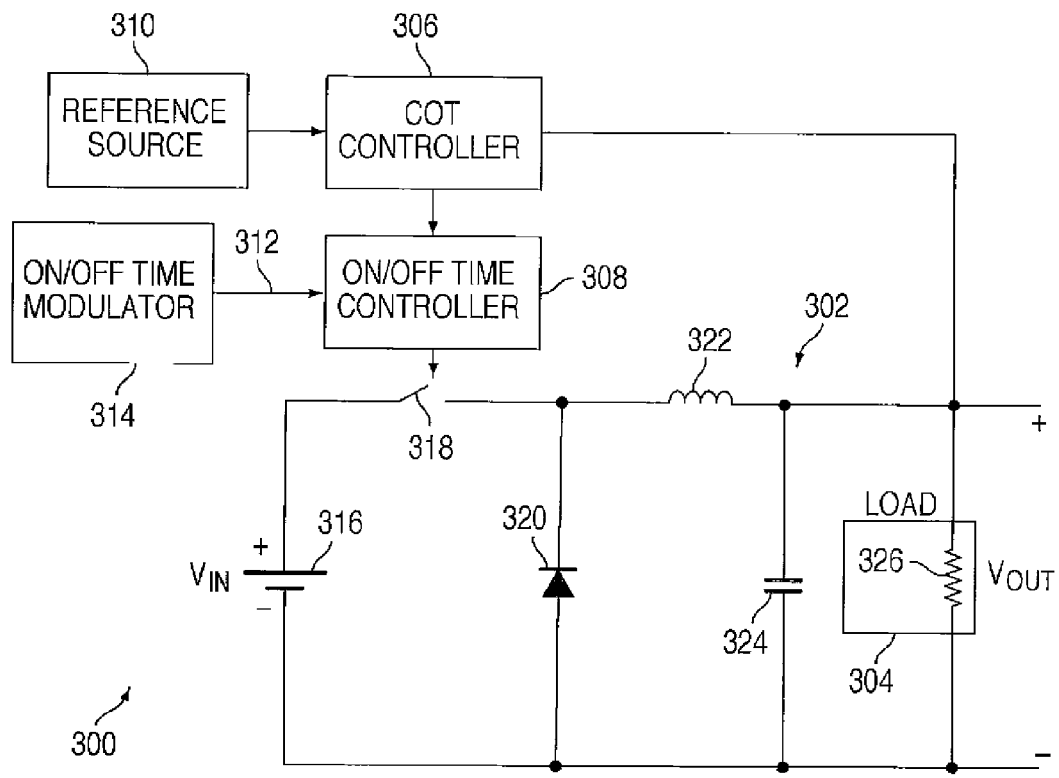
FIG. 3 illustrates an example implementation of a system for on/off time modulation of a COT switching regulator according to this disclosure.

FIG. 3 illustrates an example implementation of a system 300 for on/off time modulation of a COT switching regulator according to this disclosure. As shown in FIG. 3, the system 300 is similar to the system 100 shown in FIG. 1. The system 300 here includes a COT converter 302, a load 304, a COT controller 306, an on/off time controller 308, and a reference source 310. The on/off time controller 308 receives an on/off time modulation signal 312 from an on/off time modulator 314.

The COT converter 302 in this example represents a buck converter having an input voltage source 316, which here represents a battery. The input voltage source 316 is coupled to a switch 318, which could represent any suitable switching device such as a transistor. The switch 318 is coupled to a diode 320 and an inductor 322. The diode 320 represents any suitable structure for substantially limiting current flow to one direction. The inductor 322 includes any suitable inductive structure having any suitable inductance. Note that the diode 320 could be replaced by a switch that allows bi-directional current flow. An output capacitor 324 is coupled to the inductor 322. The capacitor 324 includes any suitable capacitive structure having any suitable capacitance. The load 304 in this example is represented by a resistance 326, which could have any suitable value.

In this example, the switch 318 is controlled by the on/off time controller 308. In a conventional COT regulator, the switch 318 could be turned on or off for a fixed amount of time during each switching cycle. In the system of FIG. 3, however, the modulation signal 312 causes the controller 308 to modulate the amount of time that the switch 318 is turned on or off during each switching cycle, such as by providing a modulation of ±1% to ±3%.

Figure 4A:
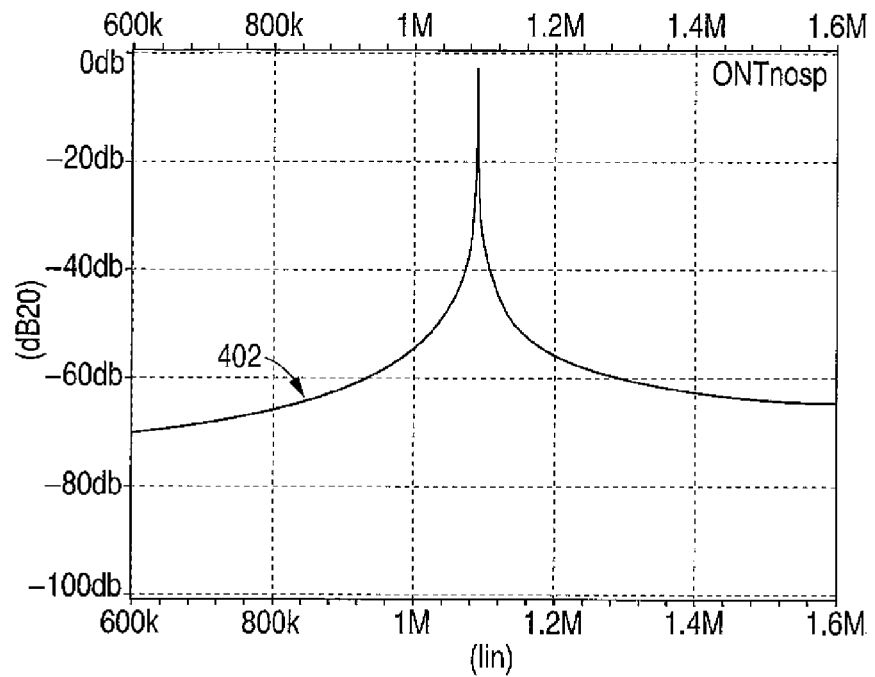
FIGS. 4A and 4B illustrate example waveforms associated with the system of FIG. 3 according to this disclosure.
Figure 4B:
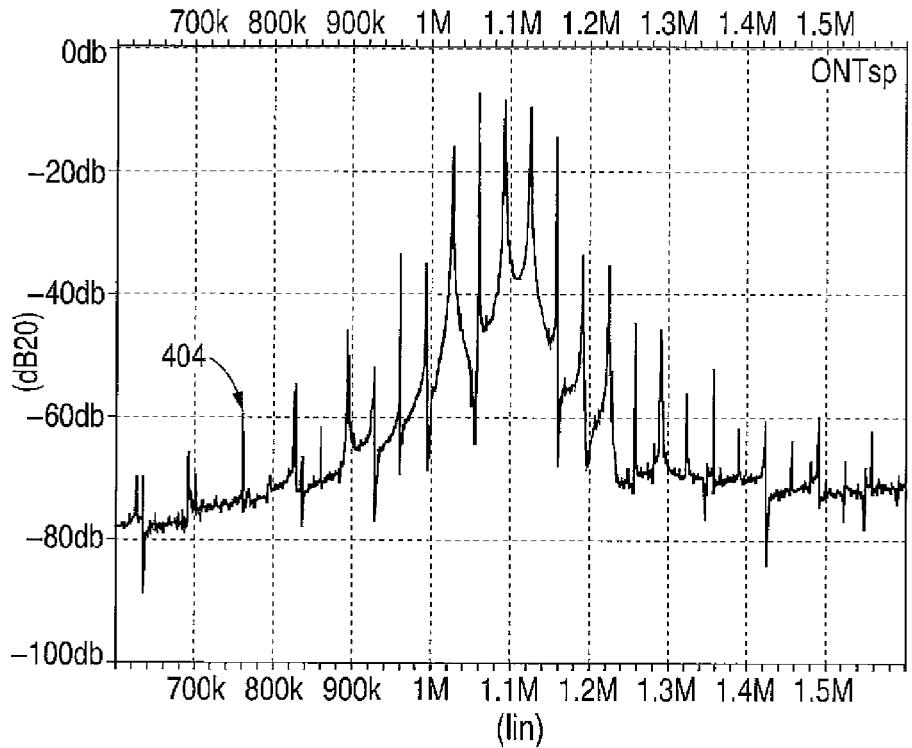

An example result obtained using the on/off time modulation signal 312 is illustrated in FIGS. 4A and 4B, which show example waveforms associated with the system 300 of FIG. 3. In particular, FIG. 4A illustrates simulated operation of the system 300 without the on/off time modulation signal 312. As shown in FIG. 4A, without the modulation signal 312, noise 402 is more concentrated and has a larger amplitude. The peak amplitude in FIG. 4A is approximately −2.64 dB. FIG. 4B illustrates simulated operation of the system 300 with the on/off time modulation signal 312. As shown in FIG. 4B, a modulation signal 312 with a triangular modulation function modulates noise 404 over a larger frequency range, and the noise 404 has a smaller amplitude compared to the noise 402. The peak amplitude in FIG. 4B is approximately −7.16 dB, resulting in a noise suppression of approximately 4.52 dB.

Once again, the on/off time modulation of a COT converter 302 can be used to modulate the frequency of noise, lowering the amplitude of the noise at frequencies of interest and spreading the power of EMI. This allows a low-EMI COT converter to be achieved. This can be done without significantly affecting the fast response time and good regulation properties of the COT converter 302.

Although FIG. 3 illustrates one example of an implementation of a system 300 for on/off time modulation of a COT switching regulator and FIGS. 4A and 4B illustrate example waveforms associated with the system 300 of FIG. 3, various changes may be made to these figures. For example, the functional division shown in FIG. 3 is for illustration only. Various components in FIG. 3 could be combined, further subdivided, or omitted and additional components could be added according to particular needs. As a particular example, while a buck converter is shown in FIG. 3, the system 300 could include any non-fixed frequency converter, such as a boost, buck-boost, SEPIC, or flyback converter. Also, the waveforms shown in FIGS. 4A and 4B are for illustration only.

Figure 5:
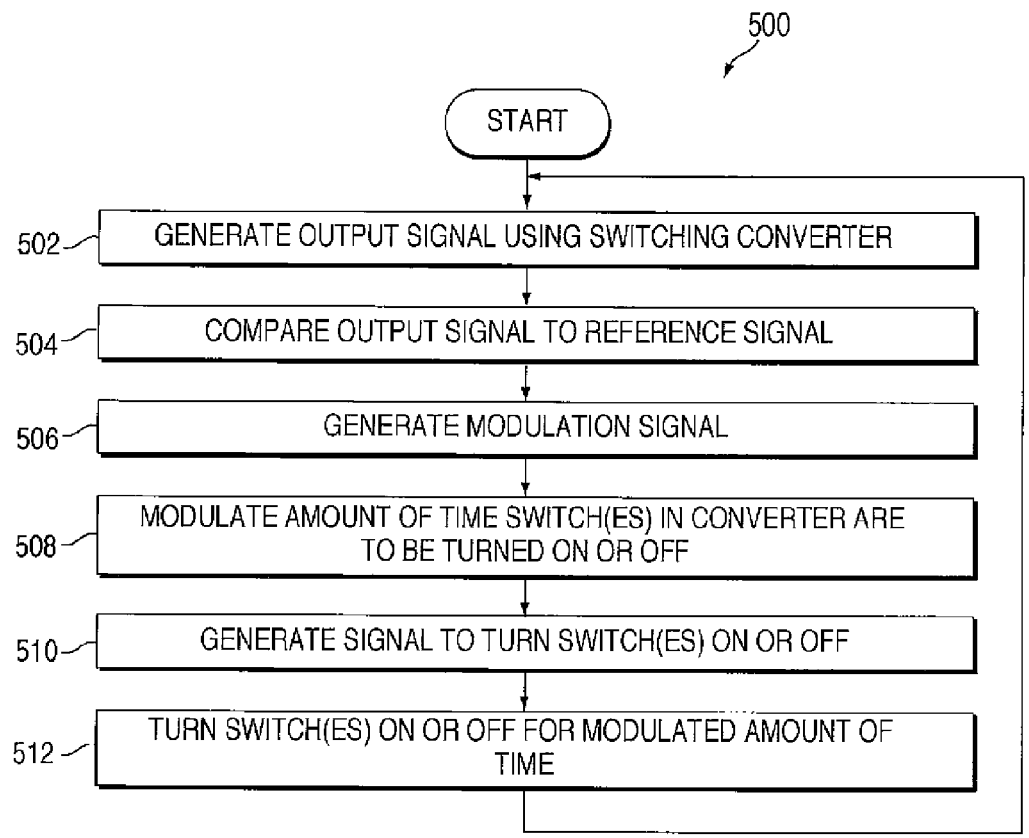
FIG. 5 illustrates an example method for on/off time modulation of a COT switching regulator according to this disclosure.

FIG. 5 illustrates an example method 500 for on/off time modulation of a COT switching regulator according to this disclosure. For ease of explanation, the method 500 is described with respect to the system 300 of FIG. 3. The method 500 could be used with any other suitable system, such as the system 100 of FIG. 1 where the COT converter 102 is a boost, buck-boost, SEPIC, or flyback converter.

As shown in FIG. 5, an output signal is generated using a switching converter at step 502. This could include, for example, generating the output voltage $V_{OUT}$ using the buck converter 302. The output signal is compared to a reference signal at step 504. This could include, for example, the COT controller 306 comparing the output voltage $V_{OUT}$ to the reference voltage $V_{REF}$ from the reference source 310. A modulation signal is generated at step 506. This could include, for example, the on/off time modulator 314 generating the on/off time modulation signal 312 using any suitable modulation function. The modulation signal causes the amount of time that one or more switches in the converter are to be turned on or off to vary at step 508. This could include, for example, the on/off time modulation signal 312 causing a modulation of 1% to 3% in the on-time or off-time of the switch 318. A signal to turn the switch(es) in the converter on or off is generated at step 510, and the one or more switches in the converter are turned on or off at step 512. This could include, for example, the on/off time controller 308 generating a one-shot pulse that turns the switch 318 on or off for the modulated amount of time. At this point, the method 500 repeats, where the output signal generated at step 502 is based (at least in part) on the switch 318 being turned on or off for the modulated amount of time.

Although FIG. 5 illustrates one example of a method 500 for on/off time modulation of a COT switching regulator, various changes may be made to FIG. 5. For example, while shown as a series of steps, various steps in FIG. 5 may overlap, occur in parallel, or occur in a different order.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method for reducing electromagnetic interference (EMI) generated by a COT (constant on-time or off-time) switching regulator operable to convert input power to regulated output power by switching one or more switches with a constant on or off time, comprising:
   operating the COT switching regulator at a modulated COT switching frequency corresponding to switching the one or more switches with a constant on or off time to generate the regulated output power;
   generating the modulated COT switching frequency by:
      generating a COT switching frequency based on comparing a feedback signal corresponding to the regulated output power with a reference signal; and
      modulating the COT switching frequency to the modulated COT switching frequency based on a modulation function over a range of frequencies centered at the COT switching frequency;
   such that EMI resulting from operating at the modulated COT switching frequency is reduced relative to operating at the COT switching frequency.

2. The method of claim 1, wherein the modulation function comprises one of: a sinusoidal function and a triangular function.

3. The method of claim 1, wherein the modulated COT switching frequency corresponds to:

$$t_{ON/OFF} + \Delta t_{MOD} F(\omega_{MOD})$$

wherein $t_{ON/OFF}$ denotes a constant on/off time associated with operating the COT switching regulator at the COT switching frequency, $\Delta t_{MOD}$ denotes an amplitude of the modulation function, $\omega_{MOD}$ denotes a frequency of the modulation function, and F( ) denotes the modulation function.

4. The method of claim 1, wherein the modulated switching frequency corresponds to a modulation frequency of 3% or less.

5. The method of claim 1, wherein the COT switching regulator is configured to provide a regulated output voltage, and wherein generating the COT switching frequency is based on comparing an output voltage of the COT switching regulator to a voltage reference.

6. A circuit for controlling the conversion of input power to regulated output power, comprising:
   a COT (constant on-time or off-time) switching converter circuit coupled to, or adapted to couple to, one or more switches, and configured to generate power regulation signals corresponding to the regulated output power, based on a COT switching signal that controls the one or more switches with a modulated COT switching frequency corresponding to switching the one or more switches with a constant on or off time;
   the COT switching converter circuit including:
      a COT controller configured to generate a COT control signal corresponding to a COT switching frequency, based on comparing a feedback signal corresponding to the regulated output power with a reference signal; and
      a modulation controller coupled to receive the COT control signal, and configured to generate the COT switching signal based on a modulation function corresponding to modulating the COT switching frequency to the modulated COT switching frequency over a range of frequencies centered at the COT switching frequency;
   such that EMI resulting from operating the COT switching converter circuit at the modulated COT switching frequency is reduced relative to operating at the COT switching frequency.

7. The circuit of claim 6, wherein the modulation function comprises one of: a sinusoidal function and a triangular function.

8. The circuit of claim 6, wherein the modulated COT switching frequency corresponds to:

$$t_{ON/OFF} + \Delta t_{MOD} F(\omega_{MOD})$$

where $t_{ON/OFF}$ denotes a constant on/off time associated with operating the COT switching regulator at the COT switching frequency, $\Delta t_{MOD}$ denotes an amplitude of the modulation function, $\omega_{MOD}$ denotes a frequency of the modulation function, and F( ) denotes the modulation function.

9. The circuit of claim 6, wherein the modulated COT switching frequency corresponds to a frequency modulation of 3% or less.

10. The circuit of claim 6, wherein the COT switching converter circuit is configured to provide regulated output voltage signals corresponding to a regulated output voltage, and wherein the COT controller comprises a voltage comparator configured to compare an output voltage of the COT switching converter circuit to a voltage reference.

11. The circuit of claim 6, wherein the COT switching converter circuit comprises one of: a buck converter, a boost converter, a buck-boost converter, a single ended primary inductor converter, and a flyback converter.

12. A power supply module for supplying regulated output power to a load, comprising:
   a COT (constant on-time or off-time) switching regulator including one or more switches, and configured to generate power regulation signals corresponding to the regulated output power;
   an inductor coupled between the COT switching regulator and the load, the COT switching regulator and the inductor comprising the power supply module;
   the COT switching regulator generating the power regulation signals based on a COT switching signal that controls the one or more switches with a modulated COT switching frequency corresponding to switching the one or more switches with a constant on or off time, the COT switching converter including:
      a COT controller configured to generate a COT control signal corresponding to a COT switching frequency, based on comparing a feedback signal corresponding to the regulated output power with a reference signal; and
      a modulation controller coupled to receive the COT control signal, and configured to generate the COT switching signal based on a modulation function corresponding to modulating the COT switching frequency to the modulated COT switching frequency over a range of frequencies centered at the COT switching frequency;
   such that EMI resulting from operating the COT switching regulator at the modulated COT switching frequency is reduced relative to operating at the COT switching frequency.

13. The module of claim 12, wherein the modulation function comprises one of: a sinusoidal function and a triangular function.

14. The module of claim 12, wherein the modulated COT switching frequency corresponds to:

$$t_{ON/OFF} + \Delta t_{MOD} F(\omega_{MOD})$$

where $t_{ON/OFF}$ denotes a constant on/off time associated with operating the COT switching regulator at the COT switching frequency, $\Delta t_{MOD}$ denotes an amplitude of the modulation function, $\omega_{MOD}$ denotes a frequency of the modulation function, and F( ) denotes the modulation function.

15. The module of claim 12, wherein the modulated COT switching frequency corresponds to a frequency modulation of 3% or less.

16. The module of claim 12, wherein the COT switching regulator is configured to provide regulated output voltage signals corresponding to a regulated output voltage, and wherein the COT controller comprises a voltage comparator configured to compare an output voltage of the COT switching regulator to a voltage reference.

17. The module of claim 12, wherein the COT switching regulator comprises one of: a buck regulator, a boost regulator, a buck-boost regulator, a single ended primary inductor regulator, and a flyback regulator.

18. The module of claim 17, wherein the COT switching regulator comprises a buck regulator.

* * * * *